Figure 1:
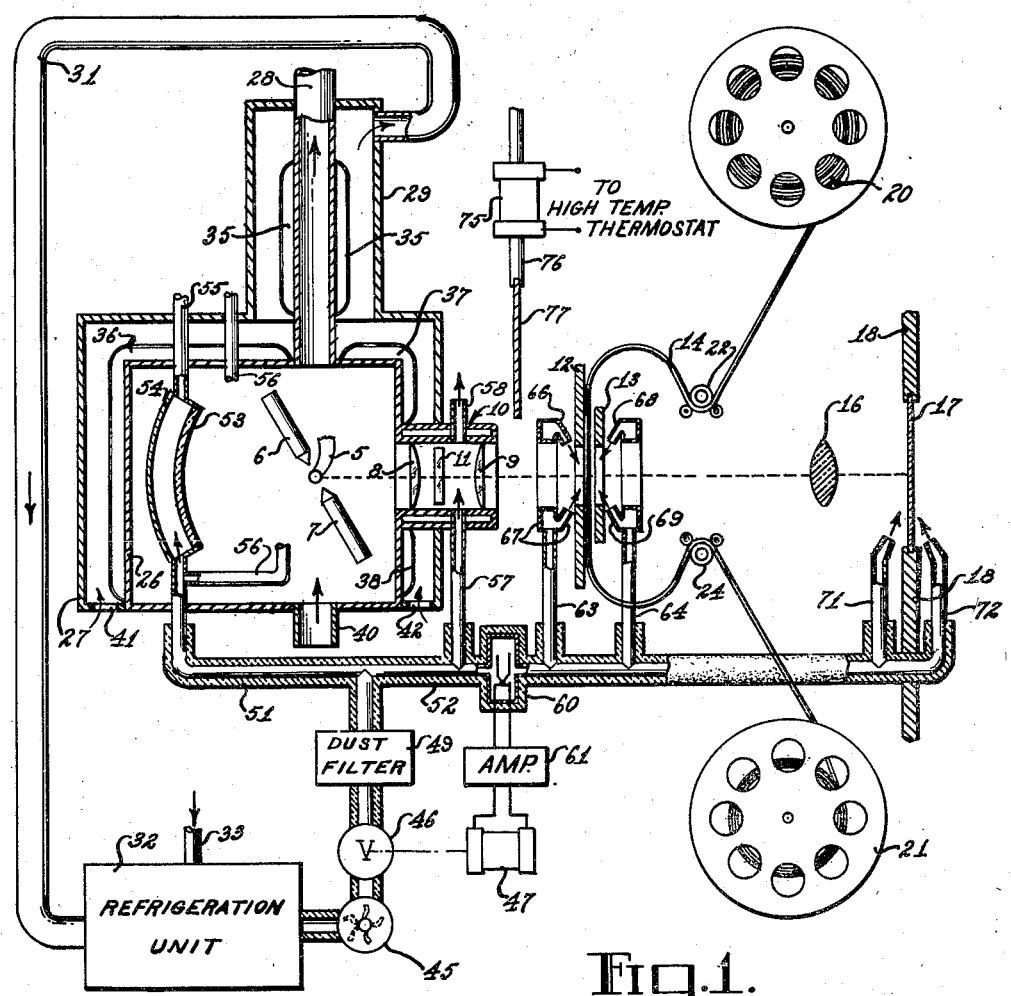

June 10, 1958   A. N. GOLDSMITH   2,837,965
PROJECTOR COOLING SYSTEM
Filed Sept. 29, 1953

INVENTOR.
ALFRED N. GOLDSMITH
BY
ATTORNEY

United States Patent Office 2,837,965
Patented June 10, 1958

2,837,965

PROJECTOR COOLING SYSTEM

Alfred N. Goldsmith, New York, N. Y., assignor to Radio Corporation of America, a corporation of Delaware Application September 29, 1953, Serial No. 383,062

14 Claims. (Cl. 88—24)

This invention relates to motion picture projecting apparatus, and particularly to a high intensity motion picture projector embodying a self-contained system of cooling the film and other portions of the apparatus subjected to the high intensity light beam.

The use of refrigerants such as liquids and air for cooling a motion picture film are known. In such projector systems, the electrodes and air are either generally at ambient room temperatures or are obtained from a separate cooling source. The present invention is particularly useful in present-day projectors for stereoscopic, three-dimensional, or the wide-screen or "Cinerama" type of picture projection, wherein a much greater light intensity is required to provide the necessary degree of illumination on the viewing screens.

The present invention employs super-cooled air which is distributed not only to the film at the film gate, but also as desired to the condensing lens optical unit, the lamphouse reflector, the heat-absorbing filter, the arc-carbon holder and jaws, and to the projecting booth port filter when the port filter is used for stereoscopic picture projection. The harmless coolant, such as air, may be cooled to any required temperature, such as between fifty and two hundred degrees below zero centigrade. The energy for refrigerating the coolant is obtained from the otherwise wasted heat from the light source, which is generally a high intensity arc lamp. The use of heat for refrigeration by absorption is well-known, and, in the present invention, the wasted heat energizes the refrigeration unit for cooling the film as well as for cooling other portions or adjuncts of the projector and for air conditioning the projection booth. Thus, the projector will provide a higher intensity light output without the use of an external energy supply, and the projected film is protected against thermal deformation or damage.

The principal object of the invention, therefore, is to facilitate the projection of motion pictures requiring a high intensity light source.

A further object of the invention is to provide an improved cooling system for a high intensity picture projector.

A still further object of the invention is to provide a motion picture cooling system in which the coolant is refrigerated by thermal energy from the wasted heat of the projector light source.

Figure 2:
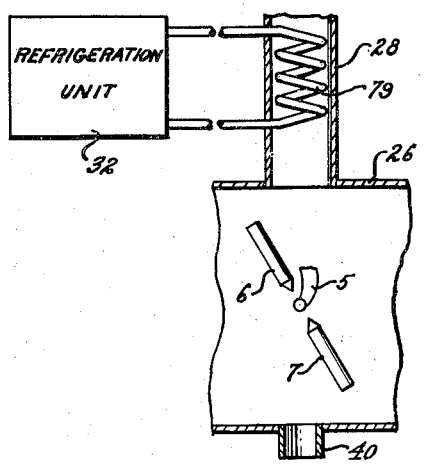

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a cross-sectional view of a motion picture projector embodying the invention, and Fig. 2 is a detailed view showing a modification for obtaining thermal energy from the light source of the projector.

Referring now to the drawings, an arc 5 is created by electrodes 6 and 7 to provide light for projection through condensing lenses 8 and 9 within a jacket 10, which light is applied to film 14 in a film gate 12—13.

The emergent light from the film is then projected by a projection lens unit 16 through a window port 17 positioned in the projection booth wall 18. The port 17 may be of ordinary transparent glass or may be a polaroid filter for three-dimensional picture projection. The film 14 is supplied from a supply reel 20 and taken up by a reel 21 after being advanced by sprockets 22 and 24 and an intermittent film advancing mechanism, not shown.

The electrodes 6 and 7 are housed within a lamphouse having an inner wall 26 and an outer wall 27. The inner wall has an exhaust duct 28 extending upwardly therefrom and the outer wall has a jacket 29 extending upwardly therefrom and surrounding the duct 28. The jacket 29 has connected thereto at its upper end a pipe 31 which extends to a refrigerating unit 32 having an air intake pipe 33.

The exhaust duct 28 is surrounded by fins 35, while the inner wall 26 is also provided with fins 36, 37, and 38. Normal room air may enter the lamphouse through an intake 40 and then pass up the exhaust pipe 28. Normal room air or other gas or liquid enters at 41 and 42 and passes between the walls 26 and 27 up the jacket 29 and through the pipe 31 to the refrigeration unit 32. This above last mentioned air or other fluid is thus heated by the fins 36, 37, and 38 on the wall 26, and also, by the fins 35 around the exhaust pipe 28, so that when it enters the pipe 31, it is at a sufficiently high temperature to provide the necessary energy to operate the refrigeration unit 32.

The refrigeration unit reduces the temperature of the air entering intake 33, which is then discharged to a motor driven pressure blower 45. The air first passes a valve 46 controlled by a solenoid 47 and then a dust filter 49. From the dust filter, the air is directed to a cross pipe having a section 51 and a section 52. A branch pipe 56 may conduct the coolant to the holders and jaws (not shown) of the arc carbons 6 and 7, which may become overheated. This will be a closed system so that no coolant escapes directly into the arc chamber to affect its stability.

In the lamphouse, is a light reflecting mirror 53, which is provided with a hollow housing 54. The cooled air from pipe 51 is directed through the housing 54 and exists from pipe 55 into either the projection booth or to the projection booth outlet vent, according to the air conditioning desired in the booth. Thus, the mirror 53 is cooled.

The first branch from pipe 52 is a pipe 57, which conducts the cooled air through and around the inner wall of jacket 10 of condensing lens unit 8—9, the air exiting through a pipe 58 to either the projection booth or to the projection booth outlet. This prevents excessive thermal expansion of the condenser lens or casing, which would result in breakage.

In the chamber 10, is shown a heat-absorbing glass filter 11, which may also be a radiant heat reflecting dichroic filter. This filter may also be placed between the lens 9 and the film gate 12—13 near the fire shutter plane. This latter placement will require to advantage a cooling arrangement for the filter similar to that shown for the film gate, and would have the added advantage that the surrounding mechanism, including the main shutter and the fire shutter, would be kept cool, and that they would not be brought, in a greatly heated condition, into the immediate neighborhood of the film under certain conditions or at certain portions of the projection cycle.

The next element in pipe 52 is a thermostatic valve unit 60, which is adapted to control the temperature of the air passing therethrough. The unit is connected to an amplifier 61 for operating solenoid 47 for controlling the valve 46. The thermostatic valve may also be placed in other positions of the system according to the control desired. The next outlet from pipe 52 could be to the filter (not shown) between lens 9 and gate 12—13 and described above.

The next branches of the pipe 52 shown are pipes 63 and 64, which direct air to both sides of the film 14 in the gate 12—13. The pipe 63 has an upper nozzle 66 and a lower nozzle 67. These nozzles direct the air at opposing angles of substantially forty-five degrees to the plane of the film. The pipe 64 has a similar pair of nozzles 68 and 69 for directing the air against the film 14 in the same manner as nozzles 66 and 67. To reduce air friction, the inside of the channels would be rounded and lie outside of the light path. The outlet openings are rectangular open grooves approximately parallel the edges of the film 14. Thus, the air that is brought into contact with both sides of the film is of the same temperature and applied in a direction such that no buckling or bowing of the film is obtained in the film gate.

At the end of pipe 52, are exit pipes 71 and 72, which direct air on both sides of port window 17. Since the air striking both sides of the window 17 is at the same temperature and in the same direction, no warping of the window will occur during the cooling operation.

Also shown in Fig. 1, is a solenoid 75 having an armature 76 connected to a shutter 77. The solenoid 75 may be connected to a high temperature thermostat located at any selected point in the line of projection, such as the optical unit or the film gate. This unit will provide a safety feature to protect the film in the event of failure of the refrigeration unit. The shutter may also be operated by the film in the event of any stoppage thereof.

Referring now to Fig. 2, there is shown the elements of the light source of Fig. 1, and the exhaust duct 28. In this modification, a coil pipe 79 is shown within the exhaust duct 28 and connected to the refrigeration unit 32. In this modification, air or other gas or liquid may be blown through the pipe 79, and thus heated, for obtaining the necessary thermal energy for the refrigeration unit 32. The refrigerating unit 32 may be of any of the absorption type systems employing solutions of such salts as lithium bromide or lithium chloride. Other types of systems operating on heat energy may also be employed. The above projection unit, therefore, embodies its own cooling unit, utilizing its own waste heat for refrigeration, thereby providing a self-contained projector and cooler which produces increased illumination on an observation screen.

I claim:

1. A film projecting system comprising a light source, said source being adapted to heat a circulating fluid, a housing for said light source, means associated with said housing for collecting and directing said circulating fluid, means for forming light from said source into a beam, means for passing a film through said light beam, a heat energized refrigeration unit, means for conducting said heated fluid from said collecting means to said refrigeration unit to provide the energy for said refrigeration unit for cooling air, and means for conducting said cooled air from said refrigeration unit to said film.

2. A film projection system in accordance with claim 1, in which means are provided for conducting cooled air to said beam forming means.

3. A film projection system in accordance with claim 1, in which a light reflector is provided in said light source housing and a projecting booth window through which said light beam is projected is also provided, together with means for conducting cooled air from said refrigerating unit to said light reflector and to said window.

4. A picture film projecting system comprising a high intensity light source, said source being adapted to heat a circulating fluid, a housing for said source, means connected to said housing for collecting and directing said circulating fluid, a film, means for projecting light from said source through said film, a heat energized refrigeration unit for cooling air, means for conducting said fluid heated by said light source to said refrigeration unit for supplying the energy required for refrigeration to cool said air, and means for conducting said cool air from said refrigeration unit to said film.

5. A picture film projecting system in accordance with claim 4, in which means are provided for directing said cool air to both sides of said film at similar angles.

6. A picture film projecting system in accordance with claim 4, in which means are provided for conducting cool air from said refrigeration unit to said light projecting means.

7. A picture film projecting system in accordance with claim 4, in which air flow controlling means and temperature actuated means are positioned in said last mentioned air conducting means, said temperature actuated means being connected to said air flow controlling means.

8. A picture film projecting system in accordance with claim 4, in which said housing includes an inner wall, an outer wall spaced from said inner wall, and fluid heating fins on said inner wall, the space between said walls communicating with said fluid collecting means.

9. A picture film projecting system in accordance with claim 8, in which a thermostatically operated fire shutter is adapted to be positioned in the light projected by said light projecting means.

10. A picture film projecting system comprising a high intensity light source, said source being adapted to heat a circulating fluid, a housing for said source, means connected to said housing for collecting and directing said circulating fluid, a film, means for projecting light from said source through said film, a heat energized refrigeration unit for cooling air, means for conducting said heated fluid heated by said light source from said collecting means to provide the energy for said refrigeration unit to cool said air, a film gate through which said film is advanced, a system of conduits outside of the light path from said light projecting means for directing cool air at similar angles in narrow streams on each side of said film in said gate, and means for connecting said conduits with said refrigeration unit.

11. A picture film projecting system in accordance with claim 10, in which said high intensity light source is an arc having holding means, and means are provided for directing cool air through said holding means.

12. A picture film projecting system in accordance with claim 10, in which said means for projecting light includes a reflector, a shell support for said reflector, a condenser lens, a jacket support for said lens, means being provided for conducting cool air from said refrigeration unit to said shell support and said jacket support.

13. A picture film projecting system in accordance with claim 12, in which said jacket support includes a heat absorbing filter.

14. A picture film projecting system in accordance with claim 12, in which a thermostatically operated fire shutter is adapted to be positioned in said light path.

References Cited in the file of this patent

UNITED STATES PATENTS

| | | |
|---|---|---|
| 1,015,145 | Davis | Jan. 16, 1912 |
| 1,036,429 | Bottlander et al. | Aug. 20, 1912 |
| 1,101,172 | Frassier | June 23, 1914 |
| 1,457,646 | Wilson | June 5, 1923 |
| 1,470,404 | Thompson | Oct. 9, 1923 |
| 1,482,313 | Miethe | Jan. 29, 1924 |
| 1,565,590 | Ritterrath | Dec. 15, 1925 |
| 1,700,656 | Tillyer | Jan. 29, 1929 |

(Other references on following page)

UNITED STATES PATENTS

| | | |
|---|---|---|
| 1,750,197 | Schoen | Mar. 11, 1930 |
| 1,770,659 | Oehmichen | July 15, 1930 |
| 1,806,712 | Schulman | May 26, 1931 |
| 1,895,887 | Lorenz | Jan. 31, 1933 |
| 1,932,076 | Kemmer | Oct. 24, 1933 |
| 1,937,379 | Berg | Nov. 28, 1933 |
| 1,971,454 | Loomis | Aug. 28, 1934 |
| 2,029,871 | Johnson | Feb. 4, 1936 |
| 2,182,453 | Sellen | Dec. 5, 1939 |
| 2,384,861 | Roswell | Sept. 18, 1945 |
| 2,399,916 | Edberg | May 8, 1946 |
| 2,408,480 | Reid | Oct. 1, 1946 |
| 2,410,457 | Nettel | Nov. 5, 1946 |
| 2,413,288 | Cahill | Dec. 31, 1946 |
| 2,548,508 | Wolfner | Apr. 10, 1951 |
| 2,726,519 | Squier | Dec. 13, 1955 |

FOREIGN PATENTS

| | | |
|---|---|---|
| 175,404 | Great Britain | Feb. 15, 1922 |
| 301,837 | Great Britain | Apr. 7, 1930 |

U. S. DEPARTMENT OF COMMERCE
PATENT OFFICE

CERTIFICATE OF CORRECTION

Patent No. 2,837,965     Alfred N. Goldsmith     June 10, 1958

It is hereby certified that error appears in the printed specification of the above numbered patent requiring correction and that the said Letters Patent should read as corrected below.

Column 2, line 48, for "exists from" read -- exits from --.

Signed and sealed this 5th day of August 1958.

(SEAL)

Attest:
KARL H. AXLINE
Attesting Officer

ROBERT C. WATSON
Commissioner of Patents